United States Patent [19]

Spoor et al.

[11] 3,773,547

[45] Nov. 20, 1973

[54] PRODUCTION OF COATINGS BY CURING WITH IONIZING RADIATION

[75] Inventors: Herbert Spoor, Limburgerhof; Kurt Demmler, Ludwigshafen, both of Germany

[73] Assignee: Badische Anilin- & Soda-Fabrik Aktiengesellschaft, Ludwigshafen/Rhineland, Rhineland/Pfalz, Germany

[22] Filed: Nov. 15, 1971

[21] Appl. No.: 198,983

[30] Foreign Application Priority Data

Nov. 30, 1970 Germany......P 20 55 893.4

[52] U.S. Cl.... 117/93.31, 117/161 K, 117/161 UC, 204/159.15, 204/159.22, 260/78.4 D, 260/78.5 BB, 260/80.81

[51] Int. Cl. .............................................. B44d 1/50

[58] Field of Search ..................... 117/93.31, 161 K, 117/161 UC; 204/159.15, 159.22; 260/78.4 R, 78.4 D, 78.4 E, 78.5 BB, 78.5 T, 80.81, 861, 875

[56] References Cited

UNITED STATES PATENTS

| | | | |
|---|---|---|---|
| 3,425,977 | 2/1969 | Skoultchi et al. | 260/78.5 T |
| 3,448,089 | 6/1969 | Celeste | 260/78.5 T |
| 3,542,587 | 11/1970 | Aronoff et al. | 117/93.31 |
| 3,650,978 | 3/1972 | Chambers et al. | 260/78.5 T |

*Primary Examiner*—Alfred L. Leavitt
*Assistant Examiner*—John H. Newsome
*Attorney*—Johnston et al.

[57] ABSTRACT

A process for the production of coatings in which the component serving as binder contains olefinically unsaturated polymeric substances having per molecule at least two units of the general formula

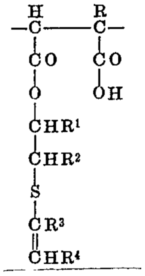

where R, $R^1$, $R^2$, $R^3$ and $R^4$ are identical or different and denote hydrogen or alkyl of one to four carbon atoms, and the coating is applied to a substrate and cured with ionizing radiation.

13 Claims, No Drawings

PRODUCTION OF COATINGS BY CURING WITH IONIZING RADIATION

This invention relates to a process for the production of coatings in which the component forming the binder contains olefinically unsaturated polymers and curing is carried out using ionizing radiation. It is known that high molecular weight olefinically unsaturated substances in admixture with olefinically unsaturated monomeric compounds can be cured under the action of ionizing radiation. The use of ionizing radiation for curing alkyd resins and unsaturated polyester resins is described for example in U.S. Pat. Nos. 3,133,828 and 3,247,012 and U.K. Pat. No. 949,191. Moreover, German Laid-Open Specification (DOS) No. 1,932,687 discloses a coating material which comprises a vinyl monomer and a vinyl polymer having at least two monoolefinically unsaturated diester side groups dissolved therein.

The methods described in the said patents and patent application and the coatings used are however still in need of improvement as regards a number of important properties which affect their application and the ultimate products.

It is an object of the present invention to provide a process which as compared with known processes for curing high molecular weight olefinically unsaturated compounds is easier to carry out and yields improved coatings.

In accordance with the present invention, the said and other objects and advantages are achieved in a process for the production of coatings involving exposure of olefinically unsaturated polymeric compounds applied to a substrate with or without olefinically unsaturated monomeric compounds and conventional additives to ionizing radiation, by using as the olefinically unsaturated polymeric substances those containing per molecule at least two units of the general formula

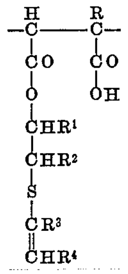

where R, $R^1$, $R^2$, $R^3$ and $R^4$ are identical or different and denote hydrogen or alkyl of one to four carbon atoms.

As regards the production of the polymeric substances suitable for the process of the invention it may be stated that they are generally obtained by copolymerization of $\alpha,\beta$-olefinically unsaturated dicarboxylic anhydrides of the general formula

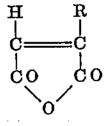

where R is $C_1$ to $C_4$ alkyl or preferably hydrogen with other olefinically unsaturated compounds using conventional free-radical-generating polymerization catalysts followed by reaction with compounds of the general formula

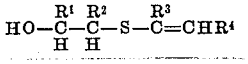

where $R^1$, $R^2$, $R^3$ and $R^4$ are identical or different and denote hydrogen or $C_1$ to $C_4$ alkyl, such as S-vinyl thioethanol, with cleavage of the anhydride ring and formation of the monoester of the corresponding dicarboxylic acid. Examples of dicarboxylic anhydrides of the above formula are citraconic anhydride and maleic anhydride, the latter being preferred.

Olefinically unsaturated compounds with which the dicarboxylic anhydrides may be copolymerized are those conventionally used, e.g. olefinically unsaturated straight-chain or branched aliphatic, cycloaliphatic and aromatic hydrocarbons such as ethylene, propylene, isobutylene, diisobutene, hexene, cyclohexene, styrene and $\alpha$-methylstyrene; nuclear alkylated styrenes, e.g. vinyltoluene; halogen-containing olefinically unsaturated compounds, e.g. vinyl chloride and chlorostyrene; vinyl esters of carboxylic acids of one to 20 carbon atoms, e.g. vinyl acetate, vinyl propionate, vinyl butyrate, vinyl pivalate, vinyl versatic esters, vinyl laurate, vinyl palmitate and vinyl stearate; vinyl ethers of alkanols of one to 20 carbon atoms, e.g. vinyl methyl ether, vinyl ethyl ether, vinyl isopropyl ether, vinyl butyl ether, vinyl isobutyl ether, vinyl-2-ethylhexyl ether, octadecyl vinyl ether and mixtures of the said compounds with each other or with other monomeric olefinically unsaturated compounds such as esters of acrylic acid or methacrylic acid with $C_1$ to $C_{20}$ monoalcohols.

The said products are generally prepared by conventional polymerization methods using free-radical-generating polymerization catalysts, e.g. by precipitation polymerization or solution polymerization as described for example in Houben-Weyl, Methoden der organischen Chemie, volume 14/1 (1961), page 178, or in German Patent Nos. 1,292,857 and 1,299,119.

The dicarboxylic anhydride component is incorporated into the polymer in an amount of from 2 to 60, preferably from 10 to 50 percent by weight.

Suitable compounds of the formula

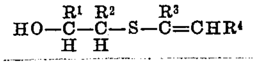

may for example be prepared by reacting hydrogen sulfide with an alkylene oxide such as ethylene oxide or propylene oxide. An example of such a compound is S-vinyl thioethanol.

The copolymers to be used in the process of the invention conveniently have a mean molecular weight of from 700 to 3,000, preferably from 800 to 2,000.

The degree of crosslinking is governed by the number of side groups containing copolymerizable double bonds. It is possible either to react all of the anhydride groups or to allow some of them to remain unreacted. At least two copolymerizable side groups should be introduced per molecule to ensure adequate crosslinking during curing.

The olefinically unsaturated polymeric substances may, if desired, be used together with up to 70, preferably up to 50, percent by weight of olefinically unsaturated monomers.

Examples of such monomers are the usual copolymerizable olefinically unsaturated compounds, especially vinylaromatics, for example styrene, styrene bearing halogen or alkyl as substituents, vinyl esters of organic carboxylic acids of one to 11 carbon atoms, e.g. vinyl acetate, vinyl propionate and vinyl pivalate, esters of acrylic or methacrylic acid with monoalcohols of one to 20 carbon atoms, e.g. butyl acrylate, isobutyl acrylate, t-butyl acrylate, 2-ethylhexyl acrylate, methyl methacrylate, butyl methacrylate, and mixtures of the said compounds with each other or with other copolymerizable monomers such as N-vinylpyrrolidone or acrylonitrile.

The copolymers used in the process of the invention may also be applied together with copolymerizable olefinically polyunsaturated compounds such as diallyl phthalate, diallyl cyanurate, divinylbenzene and preferably esters of unsaturated $C_3$ to $C_5$ monocarboxylic acids with polyhydric, especially dihydric, alcohols or oxaalkanols of two to 10 carbon atoms, especially the appropriate esters of acrylic or methacrylic acid such as glycol diacrylate, diethylene glycol diacrylate, triethylene glycol diacrylate, glycol dimethyl acrylate, 1,3-propylene glycol diacrylate or dimethacrylate, 1,4-butanediol diacrylate and dimethylacrylate, and the acrylic or methacrylic diester of 2-ethylhexanediol-1,6. There may also be used polycondensation products (conventionally used for the production of unsaturated polyester resins) of polybasic, particularly dibasic, carboxylic acids which are united like esters with polyhydric, particularly dihydric, alcohols and which may if desired contain additional radicals of monohydric carboxylic acids and/or radicals of monohydric alcohols and/or radicals of hydroxycarboxylic acids, at least some of the radicals having ethylenically unsaturated copolymerizable groups. These unsaturated polyesters are usually prepared from their components by melt condensation or by condensation under azeotrope conditions and generally have an acid number of less than 70, preferably less than 50, and a mean molecular weight of up to 4,000.

The olefinically unsaturated polymeric materials forming the binder and containing at least two units of the above general formula per molecule are applied to the substrate to be coated by conventional methods, as for example spraying, dipping, flooding, doctoring or pouring, if desired in admixture with olefinically unsaturated monomers.

It has proved to be advantageous to apply the coating composition in a layer having a thickness of up to 500 $\mu$m, particularly of from 20 to 200 $\mu$m.

The binder used in the process of the invention may also have added to it fillers, pigments and/or inorganic or organic dyes and other auxiliaries, as for example small amounts of organic solvents, conventional stabilizers for increasing stability in storage, plasticizers, flow promoters or polymers, e.g. those containing $NO_2$ groups. These additives are usually employed in minor amounts. Suitable additives are described for example in the avobementioned patents and published application and also in U.K. Pat. No. 1,159,552, German Printed Application No. 1,904,058 and German Published Application No. 1,932,687.

The process of the invention is suitable for making clear or pigmented coatings on metallic surfaces, as for example iron, steel or aluminum articles, and also articles of glass, ceramics, porcelain, wood, paper, leather and plastics, and for both porous and smooth surfaces.

The ionizing radiation used for curing the coatings may be $\alpha$-radiation, X-rays, $\gamma$-radiation, mixed radiation released in nuclear reactors or preferably electron beams.

Examples of suitable radiation sources are cobalt-60, nuclear reactors and, for electron radiation, Van de Graaff generators and other commercial generators of electron radiation. Conventional equipment for the production of ionizing and electron radiation is described for example in A. Charlesby, "Atomic Radiation and Polymers," 1960, Pergamon Press, Oxford. The radiation energy used depends on the thickness of the layer of the coating to be cured. Electron radiation which has been produced with an acceleration potential of 100 to 500, particularly 100 to 300, keV has proved to be particularly advantageous for the process of the invention.

The radiation dose necessary for curing depends on the composition of the mixture of olefinically unsaturated organic compounds to be cured, but is generally within a range from 1 to 50, preferably less than 20, mrad. Irradiation is advantageously carried out while excluding air, for example in an inert gas.

The length of irradiation depends on the intensity of radiation, the distance of the radiation source from the coating to be cured and the thickness of the coating.

In the manufacture of layers having a thickness of more than 1 mm (laminates and the like), an acceleration potential of more than 1 m.e.v. is required, while 300 to 500 k.e.V.is adequate in curing coatings less than 500 $\mu$m in thickness. A particularly low dose is needed when aromatic structures are absent.

The process of the invention is simple and safe, it has very short curing times and the coatings obtained have very valuable properties. Coatings prepared by the invention show very good adherence to the substrate, particularly to metal, good mechanical properties, particularly flexibility and scratch resistance, and when cured with the exclusion of oxygen show no surface tackiness.

The following examples illustrate the invention.

The parts and percentages are by weight.

EXAMPLE 1

Production of copolymer solutions for use in the process of the invention:

a. 50 parts of a styrene-maleic anhydride copolymer which contains 9.9 percent units of maleic anhydride is boiled under reflux for 20 hours in 250 parts tetrahydrofuran containing 5.25 parts vinyl thioethanol. 0.03 part hydroquinone is added, the tetrahydrofuran is removed in vacuo, and the residue is mixed with 225 parts triethylene glycol diacrylate. An almost colorless viscous solution is obtained. The viscosity is 227 seconds according to German Standard Specification DIN 53211 (DIN cup, 4-mm nozzle).

b. 50 parts of a styrene-maleic anhydride copolymer which contains 6.2 percent units of maleic anhydride is reacted with 3.26 parts vinyl thioethanol as described under (a) and then dissolved in 207 parts triethylene glycol diacrylate. The viscosity of the solution is 200 seconds (DIN 53211).

The solutions obtained under (a) and (b) are applied to glass and metal sheets in a thickness of approx. 200 μm and irradiated in an inert gas atmosphere with 320 k.v. electrons (beam current 50 mA; distance between scanner aperture and surface of film 6 to 7 cm; conveyor belt speed 28 m/min). Clear, hard, scratch-resistant coatings are obtained in both cases.

EXAMPLE 2

The reaction product of vinyl thioethanol and styrene/maleic anhydride copolymer prepared as described in Example 1*a* is a. mixed with twice the amount of methyl methacrylate
b. used as a bot solution substantially freed from tetrahydrofuran and without additional monomer as in Example 1 applied to glass or metal sheet in a thickness of 150 μm and cured with electron radiation at a conveyor belt speed of 15 m/min. Clear and hard coatings are obtained.

EXAMPLE 3

Copolymers of diisobutene and maleic anhydride and of vinyltoluene and maleic anhydride, each containing 15 percent maleic anhydride units, are reacted as described in Example 1 with the amount of vinyl thioethanol necessary for conversion into the half-ester, mixed with butanediol diacrylate and exposed to electron radiation (belt speed 20 m/min) in a thickness of 180 μm. Coherent coatings having good mechanical properties are obtained.

We claim:

1. A process for the production of coatings by exposing olefinically unsaturated polymeric substances forming the binders therein and having been applied to a substrate to ionizing radiation, wherein said substances contain per molecule at least two units of the general formula

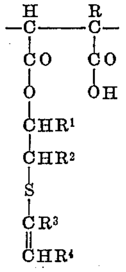

where R, $R^1$, $R^2$, $R^3$ and $R^4$ are identical or different and denote hydrogen or alkyl of one to four carbon atoms.

2. A process as claimed in claim 1 wherein R, $R^1$, $R^2$, $R^3$ and $R^4$ in the general formula are hydrogen.

3. A process as claimed in claim 1 wherein R or $R^1$ in the general formula is methyl and $R^2$, $R^3$ and $R^4$ are hydrogen.

4. A process as claimed in claim 1 wherein the olefinically unsatured polymeric substances forming the binder have been applied to a substrate in admixture with monomeric olefinically mono- or polyunsaturated substances and are cured by ionizing radiation.

5. A process as claimed in claim 1 wherein the olefinically unsaturated polymeric substances forming the binder are used in admixture with conventional additives.

6. A process as claimed in claim 4 wherein the olefinically unsaturated polymeric substances forming the binder are used together with conventional additives.

7. A process as claimed in claim 1 wherein the olefinically unsaturated polymeric substances forming the binder have a mean molecular weight of from 700 to 3,000.

8. A process as claimed in claim 1 wherein the olefinically unsaturated polymeric substances forming the binder have a mean molecular weight of from 800 to 2,000.

9. A process as claimed in claim 4 wherein the olefinically unsaturated polymeric substances are applied to a substrate together with an ester of an olefinically unsaturated $C_3$ to $C_5$ monocarboxylic acid with a dihydric alcohol or oxa-alcohol of two to 10 carbon atoms, and cured by ionizing radiation.

10. A process as claimed in claim 9 wherein said ester is an ester of acrylic or methacrylic acid.

11. A process as claimed in claim 1 wherein the olefinically unsaturated polymeric substances are used in admixture with an ester of acrylic or methacrylic acid with a $C_1$ to $C_{20}$ monoalcohol, a vinylaromatic compound or a vinyl ester of an organic $C_1$ to $C_{11}$ carboxylic acid.

12. A process as claimed in claim 1 wherein the olefinically unsaturated polymeric substance is a reaction product of vinyl thioethanol with a copolymer of maleic anhydride and a copolymerizable olefinically unsaturated compound selected from the group consisting of ethylene, propylene, butene, isobutylene, diisobutene, hexene, styrene, vinyltoluene, vinyl acetate, vinyl propionate and a vinyl ether of a $C_1$ to $C_{20}$ alcohol.

13. Coated articles which have been cured by the method as claimed in claim 1.

* * * * *

UNITED STATES PATENT OFFICE
CERTIFICATE OF CORRECTION

Patent No. 3,773,547 Dated November 20, 1973

Inventor(s) Herbert Spoor & Kurt Demmler

It is certified that error appears in the above-identified patent and that said Letters Patent are hereby corrected as shown below:

First page, left-hand column, thirteenth line, "Nov. 30, 1970" should read -- Nov. 13, 1970 --.

Signed and sealed this 15th day of October 1974.

(SEAL)
Attest:

McCOY M. GIBSON JR.
Attesting Officer

C. MARSHALL DANN
Commissioner of Patents

RM PO-1050 (10-69)

USCOMM-DC 60376-P69
☆ U.S. GOVERNMENT PRINTING OFFICE : 1969 O—366-334.